US012275395B2

(12) United States Patent
Röber et al.

(10) Patent No.: US 12,275,395 B2
(45) Date of Patent: Apr. 15, 2025

(54) PARKING PROCESS AND PARKING ASSISTANCE SYSTEM

(71) Applicant: FORD GLOBAL TECHNOLOGIES, LLC, Dearborn, MI (US)

(72) Inventors: Marc Röber, Düsseldorf (DE); Tobias Wittrock, Hürth (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 227 days.

(21) Appl. No.: 17/973,826

(22) Filed: Oct. 26, 2022

(65) Prior Publication Data

US 2023/0137576 A1 May 4, 2023

(30) Foreign Application Priority Data

Nov. 2, 2021 (DE) .......................... 102021128430.9
Sep. 12, 2022 (DE) .......................... 102022123125.9

(51) Int. Cl.
*B60W 30/06* (2006.01)
*B60W 50/14* (2020.01)

(52) U.S. Cl.
CPC ............ *B60W 30/06* (2013.01); *B60W 50/14* (2013.01); *B60W 2540/215* (2020.02)

(58) Field of Classification Search
None
See application file for complete search history.

(56) References Cited

U.S. PATENT DOCUMENTS

| 6,476,730 B2* | 11/2002 | Kakinami | B62D 15/028 |
| | | | 348/E7.087 |
| 10,363,960 B2* | 7/2019 | Stefan | B60W 30/06 |
| 2004/0204807 A1* | 10/2004 | Kimura | G06T 7/60 |
| | | | 701/1 |

(Continued)

FOREIGN PATENT DOCUMENTS

| DE | 102010061904 A1 * | 5/2012 | ......... B62D 15/0285 |
| DE | 102017210037 A1 | 12/2018 | |

(Continued)

OTHER PUBLICATIONS

English Text of DE-102010061904-A1, May 24, 2012 (Year: 2012).*

*Primary Examiner* — Daniel L Greene
(74) *Attorney, Agent, or Firm* — Frank L. Lollo; MacMillan, Sobanski & Todd, LLC (57) ABSTRACT

A parking operation of a vehicle from a starting position to a parked position in a perpendicular parking space includes determining a trajectory into the parked position with at least one parking movement and potentially one or more corrective movements which includes a change of direction. A blocking line is defined running in a straight line and longitudinally through the vehicle when positioned in the starting position. If the trajectory provides for one or more corrective movements, then it is determined whether the blocking line will be cleared by the vehicle during a nonfinal parking movement or a nonfinal corrective movement. If the blocking line will be cleared then a signal is output for interrupting the trajectory. The interruption can include an alert and/or a determination of a corrected trajectory in such a way that clearing the blocking line by the vehicle during the nonfinal parking movement is prevented.

18 Claims, 4 Drawing Sheets

(56) References Cited

U.S. PATENT DOCUMENTS

| | | |
|---|---|---|
| 2011/0080304 A1 | 4/2011 | Toledo et al. |
| 2016/0257343 A1* | 9/2016 | Freistadt ............... B60W 30/06 |
| 2016/0272115 A1 | 9/2016 | Max et al. |
| 2017/0210421 A1* | 7/2017 | Coester ................ B62D 15/028 |
| 2019/0101925 A1* | 4/2019 | Simmons ............. G05D 1/0255 |
| 2021/0316763 A1* | 10/2021 | Domahidi ........... B60W 40/105 |

FOREIGN PATENT DOCUMENTS

| | | |
|---|---|---|
| EP | 3251922 A1 | 12/2017 |
| WO | 2012062517 A1 | 5/2012 |

* cited by examiner

PARKING PROCESS AND PARKING ASSISTANCE SYSTEM

CROSS REFERENCE TO RELATED APPLICATIONS

This application claims priority to application DE102021128430.9, filed in the German Patent and Trademark Office on Nov. 2, 2021, and to application DE102022123125.9, filed in the German Patent and Trademark Office on Sep. 12, 2022, both of which are incorporated herein by reference in their entirety.

STATEMENT REGARDING FEDERALLY SPONSORED RESEARCH

Not Applicable.

BACKGROUND OF THE INVENTION

The invention concerns a method for parking a vehicle from a starting position to a parking position in a perpendicular parking space, a parking assistance system, and computer program instructions embodying the method.

Various parking assistance systems with which a parking process can be supported are known from the prior art. For example, advice or instructions, for example regarding steering behavior, can be issued to the driver. In addition, the parking process can be carried out partially or completely automatically by influencing or even taking over the lateral guidance and possibly also the longitudinal guidance of the vehicle. With automatic lateral guidance, the parking assistance system takes over the steering of the vehicle. Longitudinal guidance, on the other hand, concerns the acceleration and braking of the vehicle as well as any change of direction between the forward direction and the reversing direction, which can also be partially or completely taken over by the parking assistance system, depending on the degree of automation.

Parking assistance systems can support or carry out the parking process in longitudinal parking spaces and/or perpendicular parking spaces, wherein longitudinal parking spaces are essentially parallel to the direction of travel of the main traffic or to the roadway and perpendicular parking spaces are essentially perpendicular to the direction of travel of the main traffic or to the roadway.

In particular, parking in perpendicular parking spaces often represents a complex situation, as corrective movements are often required to achieve the desired parking position. Such corrective movements often require reversing (e.g., re-entering the roadway) after the vehicle has already entered the perpendicular parking space. This can lead to the following traffic already accelerating again and hindering the corrective movement. As a result, there may be interference between the following traffic and the parking vehicle carrying out the corrective movement.

In order to avoid accidents, for example, U.S. Patent Application Publication 2017/0210421A1 provides a method for avoiding accidents with following traffic in an automated parking process of a motor vehicle with a parking assistance system with at least automatic lateral guidance. If it is determined that a corrective movement is required to reach the parking position, the vehicle is prevented from entering so far into the perpendicular parking space during the parking movement that the driver would then no longer have a clear view of the following traffic at the beginning of the corrective movements in the forward or backward direction due to the visual obstruction by a vehicle bounding the perpendicular parking space.

As described in US2017/0210421A1, in order to determine that the vehicle is too far into the perpendicular parking space a line of sight is defined, which is typically formed by the rear or front side of one or more vehicles bounding the perpendicular parking space and facing the traffic space. Furthermore, a reference point is defined, for example on the connecting line between the two B-pillars of the vehicle. It is then checked whether this reference point reaches or exceeds the line of sight, if appropriate with a certain offset.

Determination of the line of sight requires corresponding monitoring of the vehicle environment and localization of the vehicles bounding the perpendicular parking space by means of an appropriate environmental sensor system, since the line of sight is determined on the basis of the position of the vehicles bounding the perpendicular parking space. In addition, there may be situations in which the line of sight cannot be determined or cannot be reliably determined, for example since the perpendicular parking space is bounded only on one side by a vehicle or in cases of a road course which is not rectilinear, as a result of which the rear and front sides of the vehicles bounding the perpendicular parking space are not arranged parallel to one another. These situations may also result in a complex and computationally complicated determination of the line of sight.

The method described in US2017/0210421A1 can prevent the view of the driver of the parking vehicle from being blocked by adjacent parked vehicles, so that the driver can pay sufficient attention to the following traffic when carrying out the corrective movement. However, regardless of the question of a line of sight between the driver and the following traffic, another source of potential interference is the following traffic as such. A situation may arise in which the following traffic has already accelerated again or does not stop at all, although the parking process has not yet been completed and the parking position has not yet been reached, i.e. a corrective movement must be made, for example if the vehicle being parked is already too far into the perpendicular parking space and a corrective movement is no longer expected and/or it is already possible again to drive around the vehicle in the perpendicular parking space without impeding oncoming traffic. This can potentially lead to interference between the parked vehicle and the following traffic when the corrective movement is carried out.

Although the method proposed in US2017/0210421A1 likewise possibly makes it possible to achieve the situation in which the vehicle being parked remains visible to the following traffic during the parking process until shortly before the final parked position is reached, the extent of this effect is strongly dependent on the determination of the reference point with respect to that end of the vehicle being parked which is remote from the perpendicular parking space and, therefore, cannot be reliably achieved. Depending on the design of the vehicle being parked, for example depending on the length of the bonnet (e.g., delivery vans with a short bonnet, sports cars with a long bonnet, or the specific design of the vehicle rear end), and depending on whether it is a forward or reverse parking process, a more or less large part of the vehicle being parked remains visible to the following traffic and a more or less large section of the roadway is blocked by the vehicle being parked. In other words, the mere existence of a line of sight does not yet mean that the traffic space is blocked for the following traffic, in particular not when the driver of the vehicle being parked is sitting very far forward (during forward parking)

or very far back (during reverse parking) in the vehicle. The determination of the line of sight and the reference point, as proposed in US2017/0210421A1, is therefore not suitable for reliably preventing, during the parking process, the following traffic from already accelerating again or not stopping at all in the first place, even though the parking process has not yet been completed and the parked position has not yet been reached.

SUMMARY OF THE INVENTION

Against this background, it is an object of the invention to specify a method, a parking assistance system, and a computer program with which the disadvantages described above can be avoided.

This object is achieved by the subject matter of the independent claims. The dependent claims relate to embodiments of these solutions according to the invention.

A basic idea of the present invention is to clear the traffic space for the following traffic during a parking process of a vehicle only when no corrective movements in the traffic space of the following traffic are required. This is achieved by keeping this traffic space occupied by the parking vehicle, so that it is obvious to the following traffic that the parking process has not been completed and any corrective movements are still to be expected. Situations caused by the vehicle re-entering the traffic space as part of a corrective movement can be avoided.

A first aspect of the invention concerns a method for supporting a parking process of a vehicle from a starting position to a parking position in a perpendicular parking space.

A vehicle can be understood as any mobile means of transport, such as a passenger car. The vehicle has a parking assistance system that can be used to support the parking process. In a simple design, the parking assistance system issues advice or instructions to the driver. In a further design, the parking assistance system can be designed for automatic lateral guidance of the vehicle. This means that the steering of the vehicle is automatically taken over by the parking assistance system. In a further embodiment, the parking assistance system may be designed for automatic lateral guidance of the vehicle and for automatic longitudinal guidance of the vehicle. This means that in addition to the steering of the vehicle, the braking and acceleration of the vehicle as well as a change of direction between the forward direction and the reversing direction, for example control of the vehicle transmission, can be carried out partially or completely automatically. The latter is also referred to as "fully assisted parking."

The inventive method has the steps set out in more detail below. Here, the steps can be carried out in the order mentioned, or alternatively, overlapping in time or in a different order as required. The method may be computer-implemented, i.e. at least one step of the method, preferably several or all steps of the method, may be executed using a computer program.

A first step of the method is to determine a trajectory, i.e. a path of movement, for a movement of the vehicle into the parking position with at least one parking movement. The trajectory can be determined, for example, from the starting position to the parking position. In addition, the trajectory can be updated periodically or continuously so that the trajectory is determined from the current position of the vehicle to the parking position. The trajectory may be intended for completion in the forward or reverse direction, for example depending on whether parking is to be done forwards or backwards. In other words, the proposed method can be used irrespective of the direction of travel, i.e. both for parking in the reverse direction and in the forward direction.

Depending on the design of the parking assistance system, the trajectory can be issued to the driver so that he can perform his driving maneuver according to the trajectory. Alternatively, the trajectory can be used for automatic lateral guidance and, if necessary, longitudinal guidance of the vehicle.

The trajectory provides for at least one parking movement. The first parking movement starts in the starting position. A parking movement is a driving maneuver that is carried out towards the parking position, i.e. the vehicle approaches the parking position. Accordingly, in the case of a parking operation in the reverse direction, all parking movements are in the reversing direction and in the case of a parking operation in the forward direction, all parking movements are in the forward direction.

In addition, the trajectory may provide for one or more corrective movements. A corrective movement is a driving maneuver in which the vehicle moves away from the parking position. Accordingly, in the case of a parking operation in the reversing direction, all corrective movements are made in the forward direction and in the case of a parking operation in the forward direction, all corrective movements are made in the reversing direction.

During the parking process, parking movements and corrective movements alternate, i.e. after each corrective movement a parking movement takes place and after each parking movement a corrective movement takes place, if the final parking position has not yet been reached with this parking movement. The parking process therefore includes n parking movements and n−1 corrective movements with n≥1. Each parking movement or corrective movement usually begins and ends when the vehicle is stationary and is completed in the forward direction or reverse direction according to the determined trajectory. Each parking movement and each corrective movement therefore begins with a change of direction compared to the immediately preceding corrective movement or parking movement.

In a further step of the method, it is checked whether the trajectory provides for one or more corrective movements. Correction movements are required, for example, if the desired parking position cannot be reached with the first parking movement. Various criteria can be defined on the basis of which it is checked whether the desired parking position has been reached or not. Such criteria may be, for example, the distance of the vehicle from the vehicles bounding the perpendicular parking space or a skewing between the orientation of the vehicle and the orientation of the parking space.

In a further step of the method, a blocking line is defined. The blocking line runs in the longitudinal direction through the vehicle positioned in the starting position. The longitudinal direction as used herein means that the blocking line intersects the rear of the vehicle and the front of the vehicle, i.e. runs through the rear of the vehicle and the front of the vehicle. The blocking line is defined independently of the configuration and/or boundary of the perpendicular parking space, in particular independently of vehicles bounding the perpendicular parking space, with the result that it is possible to dispense with a corresponding environmental sensor system and to define the blocking line with a lower computational complexity than the prior art. In addition, in comparison with the line of sight known from the prior art, the blocking line is definable for many other situations, such as in the case of a road course which is not rectilinear and in which the rear and front sides of the vehicles bounding the perpendicular parking space are not arranged parallel to one another, with the result that the inventive method can be used more broadly.

The step of the method of determining the blocking line can be carried out before, after, temporally overlapping or simultaneously with the determination of the trajectory and the checking of whether the trajectory provides for one or more corrective movements. Optionally, the blocking line can also be determined under the condition that the trajectory provides one or more corrective movements.

If it is determined that the trajectory provides for one or more corrective movements, a further step of the method will determine whether the blocking line will be cleared by the vehicle during a nonfinal parking movement before the last parking movement is carried out. In other words, it is checked whether a parking movement, which is not the last parking movement, was or would be carried out so far in the direction of the parking position that the blocking line was or would be cleared at least temporarily. The phrase "during a nonfinal parking movement" therefore means that an arbitrarily short period of time for clearing the blocking line is sufficient, but not that the blocking line must be cleared during the entire nonfinal parking movement.

Clearing the blocking line is confirmed if at the time of the check the vehicle has already cleared the blocking line as part of a parking movement, or if the blocking line will be cleared before the vehicle carries out the last parking movement during a movement of the vehicle along the trajectory as part of a parking movement.

If the blocking line is cleared by the vehicle during a nonfinal parking movement before the last parking movement is carried out, a signal will be output. For example, the blocking line can be considered as cleared by the vehicle if a contour of the vehicle no longer touches or intersects the blocking line. The contour of the vehicle is defined to correspond to an outer boundary line of the vehicle.

Furthermore, it is checked not only whether the blocking line will be cleared during a nonfinal parking movement before the vehicle carries out the last parking movement, but also whether the blocking line will be cleared during a nonfinal corrective movement before the vehicle carries the last parking movement. In other words, it is checked whether the blocking line was neither cleared in the direction of the side facing the parking position nor in the direction of the side facing away from the parking position before the last parking movement was carried out.

This can prevent the following traffic from passing between the parking vehicle and the perpendicular parking space if, for example, a particularly large movement out of the perpendicular parking space should be required as part of a corrective movement.

For example, the output signal can cause the determination of a corrected trajectory. The correction is carried out in such a way that clearing the blocking line by the vehicle is prevented before the last parking movement is carried out.

The corrected trajectory can then be output to the driver so that he can align his driving maneuver with the corrected trajectory. Alternatively, the corrected trajectory may be used as the basis for automatic lateral guidance and, if appropriate, longitudinal guidance of the vehicle. In other words, the method may include automatic lateral guidance and, if appropriate, longitudinal guidance of the vehicle along the corrected trajectory.

Alternatively or additionally, the output signal can interrupt the parking process and issue an alert message, for example to the driver of the vehicle. For example, the alert message may be designed in such a way that the driver is asked to observe the following traffic. In addition, it may be provided that the parking process can only be continued or will be continued if there is a confirmation signal confirming a free traffic space in the area of the corrective movement and/or parking movement. The confirmation signal can, for example, be initiated by the driver.

Clearing or not clearing of the blocking line is essentially equivalent to clearing or not clearing the traffic space required to carry out corrective movements and parking movements to reach the parking position. For this purpose, the course of the blocking line is determined in such a way that the entry of subsequent vehicles into this traffic space is hindered as long as the parking vehicle has not cleared the blocking line.

As a result, the parking process can be completed more quickly, since an interruption by following traffic is not to be expected. In addition, traffic efficiency is increased both for the parked vehicle and for the following traffic, as a restart or acceleration of the following traffic is only possible after completion of the parking process or shortly before completion of the parking process, when no further corrective movement back towards the road is required.

Investigations of the inventors of the present invention also showed that a straight course of the blocking line in the longitudinal direction through the vehicle positioned in the starting position is sufficient in almost all applications to determine the traffic space to be kept free for the execution of the corrective movements. A separate determination of the free traffic space as such with specific area or spatial limitations is therefore superfluous. Further calculations can be carried out more easily and with more efficiency taking into account the blocking line than by taking into account a two-dimensional area or even a three-dimensional space.

If a corrected trajectory is determined in order to prevent clearing of the blocking line by the vehicle before the last parking movement is carried out, this corrected trajectory can be advantageously taken into account in the context of at least automatic lateral guidance of the vehicle. This enables at least partially automatic parking of the vehicle.

The demanding task of monitoring the following traffic and the entire traffic situation by the driver during the parking process can be supported, for example with an SAE Level 2 system, so that both integrity of operation and driving comfort can be improved. In addition, the invention can also be used in autonomous vehicles of SAE levels 4-5 and can enable parking of driverless vehicles in combination with other functions and methods.

If the output signal causes interruption of the parking process and issuing of an alert message to the driver, the parking operation is improved by alerting the driver to the situation. If, in addition, it is provided that the parking process can only be continued if there is a confirmation signal confirming a free traffic space in the area of the corrective movement and/or parking movement, the driver is (again) involved in the parking process and performance is increased by additional monitoring of the traffic space by the driver.

Several ways to determine the blocking line are explained below.

According to different design variants, the blocking line can be determined in a straight line and/or parallel to a boundary of the roadway.

The blocking line can be a straight line in the geometric sense. This makes it easy to determine the blocking line and check whether the blocking line will be cleared before the vehicle carries out the last parking movement.

Alternatively or additionally, the blocking line can run parallel to a boundary of the roadway. A distance to be maintained between the roadway boundary and the blocking line can be specified. This advantageously allows blocking of the traffic space in the area of the perpendicular parking space even with a curved course of the roadway.

According to other design variants, the blocking line can be determined parallel to a longitudinal axis of the vehicle. The longitudinal axis of a vehicle refers to the axis that runs in the direction of the greatest extent of the vehicle. As a rule, the longitudinal axis runs centrally through the front of the vehicle and the rear of the vehicle. Optionally, the blocking line can be determined running along the longitudinal axis. In other words, the blocking line may correspond to an extension of the longitudinal axis of the vehicle.

Also optionally, the blocking line can be determined at a predetermined distance from the longitudinal axis of the vehicle. Such a distance can depend or can be determined depending on various influencing variables. Possible influencing variables are, for example, the roadway width in the starting position and the number of lanes in the same or different directions. For example, information about these influencing variables can be retrieved from a database in which the corresponding values are stored for different positions. The starting position of the vehicle can be determined, for example, by means of a global navigation satellite system, for example GPS.

A determination of the course of the blocking line depending on the longitudinal axis of the vehicle is an easy way to determine the blocking line, since no further sensors are required to identify any reference points, such as road markings, other vehicles, etc. At the same time, this eliminates possible sources of error when determining the blocking line.

According to further design variants, the blocking line can be determined in the middle between boundaries of a roadway on which the starting position is located.

Boundaries of the roadway can be detected by means of conventional sensors, such as camera sensors, ultrasonic sensors, RADAR sensors and LIDAR sensors, etc.

By including the roadway boundaries in the determination of the blocking line, the traffic space required to carry out the corrective movement can be more precisely defined. Clearing this traffic space too early can thus be avoided with a greater probability.

Another aspect of the invention relates to a parking assistance system to support a parking process of a vehicle. The parking assistance system includes means of performing one of the methods described above. The parking assistance system is therefore designed for the execution of one of the methods described above and the above explanations for explaining the methods also serve to describe the parking assistance system according to the invention. The advantages of the methods are correspondingly associated with the parking assistance system according to the invention.

The parking assistance system may in particular have a processing unit designed to determine a trajectory for a movement of the vehicle into the parking position, to check whether the trajectory provides for one or more corrective movements, to determine a blocking line running in a straight line in the longitudinal direction through the vehicle positioned in the starting position and to check whether the blocking line will be cleared by the vehicle during a nonfinal parking movement and, optionally, during a nonfinal corrective movement before the execution of the last parking movement. If the blocking line is cleared by the vehicle before the last parking movement is carried out the processing unit generates a signal. The signal can be processed internally in the processing unit and can cause the determination of a corrected trajectory using the processing unit.

Optionally, the parking assistance system may have an output unit designed to output an alert message if the blocking line is cleared by the vehicle before the last parking movement is carried out. The output unit may be in the form of an image signal output unit and/or a sound signal output unit, for example.

In addition, the parking assistance system may have an input unit, for example for user-specific input and selection of options, and a memory unit.

The parking assistance system may preferably be designed for at least automatic lateral guidance of a vehicle during a parking process. Optionally, the parking assistance system may also be designed for partially or completely automatic longitudinal guidance of the vehicle during a parking process. For this purpose, the parking assistance system can interact with a control unit of the vehicle and can be connected to it in a signal-transmitting manner.

Another aspect of the invention concerns a computer program. The computer program includes commands that cause it to perform one of the methods described above when the program is executed by a computer.

Therefore the advantages of the described methods are correspondingly associated with the proposed computer program. A computer program may be understood as a program code that can be stored on a suitable medium and/or retrievable via a suitable medium. To store the program code, any medium suitable for storing software, for example a non-volatile memory installed in a control unit, a DVD, a USB stick, a flashcard or the like, can be used. The retrieval of the program code can be done, for example, over the Internet or an intranet or over another suitable wireless or wired network.

BRIEF DESCRIPTION OF THE DRAWINGS

The invention is explained in more detail below on the basis of the illustrations and the associated description.

DETAILED DESCRIPTION OF PREFERRED EMBODIMENTS

Figure 1:
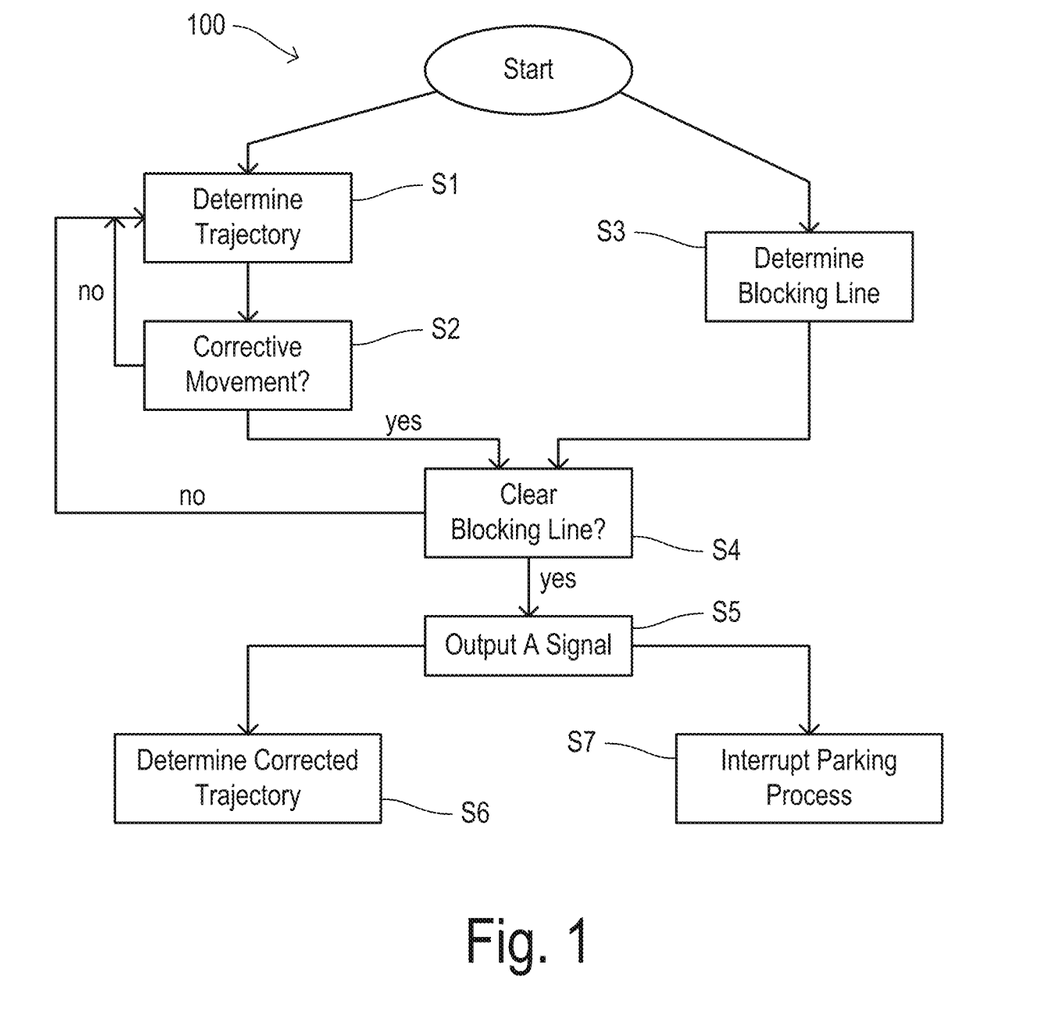
FIG. 1 shows a sequence of an exemplary method.
Figure 2A:
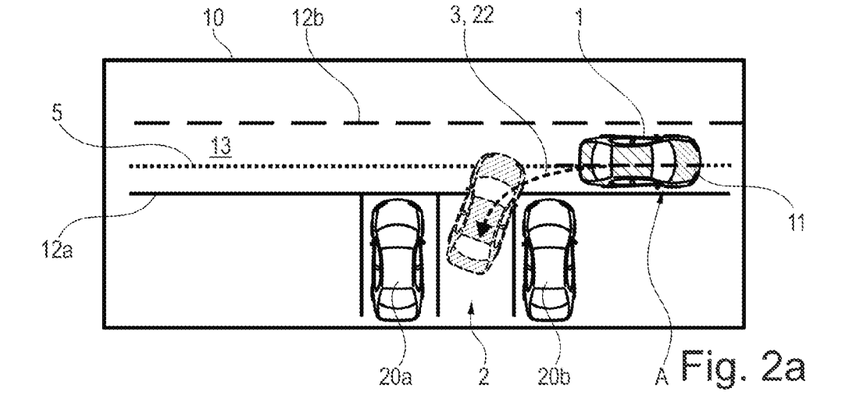
FIGS. 2a, 2b, and 2c show a schematic representation of an exemplary parking process with the vehicle in the starting position (FIG. 2a), during the corrective movement (FIG. 2b) and in the parking position (FIG. 2c).
Figure 2B:
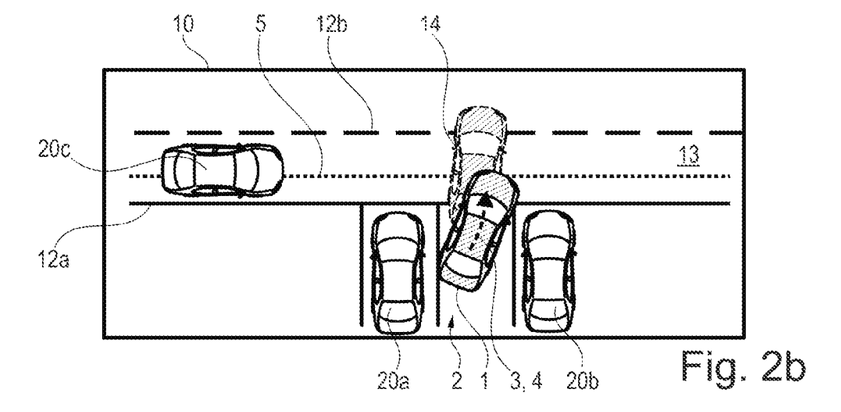
Figure 2C:
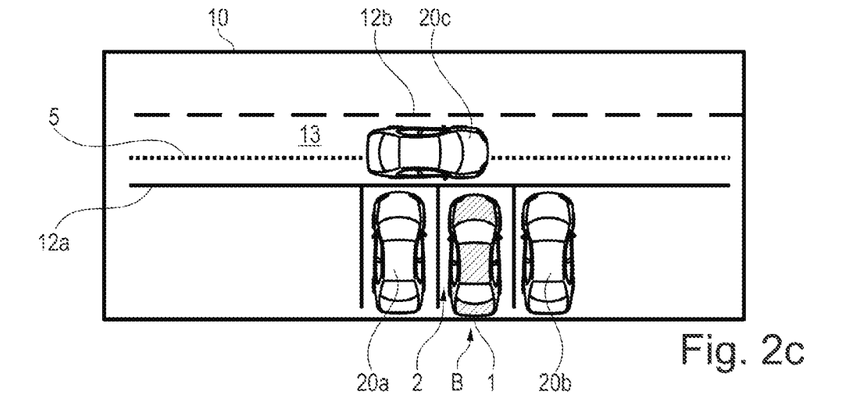

FIG. 1 shows a sequence diagram of an exemplary computer-implemented method 100 for supporting a parking process of the vehicle 1, for example a passenger car. The method 100 can be carried out by means of a parking assistance system 200, for example as described in FIG. 3 or 4. In the context of the method 100, the vehicle 1 moves from a starting position A to a parking position B, wherein the parking position B is located in a perpendicular parking space 2. Such a parking process is shown schematically in FIGS. 2a to 2c. In FIGS. 2a to 2c, the current position of vehicle 1 is shown with a solid contour, and a subsequent future position is shown with a dashed contour. The method 100 has the steps of the method S1 to S7 explained below.

At the start of method 100, the vehicle 1 is in the starting position A on the roadway 13, which is bounded by lane boundaries 12a, 12b in the form of road markings (see FIG. 2a). Starting from the starting position A, the vehicle 1 wants to park in the perpendicular parking space 2 and take the parking position B (see FIG. 2c). As shown in FIGS. 2a to 2c, the perpendicular parking space 2 is laterally bounded by two other vehicles 20a, 20b.

In step S1 of the method, a trajectory 3 for the movement of the vehicle 1 from the starting position A to the parking position B is determined, which comprises at least one parking movement 22. In the following step S2 of the method, it is checked whether the trajectory 3 provides for one or more corrective movements 4. If this is not the case, the method 100 returns to step S1 of the method and a trajectory 3 is again determined based on the current position of the vehicle 1. This means that the trajectory 3 is continuously updated until it is either determined that one or more corrective movements 4 are required or that the vehicle 1 has reached the parking position B.

If, on the other hand, it is determined in step S2 of the method that the trajectory 3 provides for one or more corrective movements 4, the method 100 proceeds to step S4 of the method. This is the case with the parking process shown in FIGS. 2a to 2c. The required corrective movement 4 is shown in FIG. 2b.

Concurrently with steps S1 and S2 of the method, a blocking line 5 is determined in step S3 of the method. The blocking line 5 runs in a straight line and in the longitudinal direction through the vehicle 1 positioned in the starting position A, more precisely along the longitudinal central axis 11 of the vehicle 1.

In step S4 of the method, it is then checked whether the blocking line 5 will be cleared by the vehicle 1 before a final planned parking movement 22 is carried out. In the exemplary embodiment, this check is carried out both in relation to all nonfinal parking movements 22 and all nonfinal corrective movements 4.

If this is not the case, the method 100 returns to step S1 of the method. If, on the other hand, it is determined that the blocking line 5 will be cleared by the vehicle 1 before the last parking movement 22 is carried out, the method 100 proceeds to step S5 of the method.

In step S5 of the method, a signal 6 is output. Depending on the design of the parking assistance system 200, the signal 6 can be further processed according to step S6 of the method and/or according to step S7 of the method.

Step S6 of the method provides that the output signal 6 causes the determination of a corrected trajectory 7, in such a way that clearing the blocking line 5 by the vehicle 1 before executing the last parking movement 22 is prevented. The corrected trajectory 7 can, for example, be output to a driver of the vehicle 1, for example displayed on a display as the output unit 17. Alternatively or additionally, the corrected trajectory 7 of the parking assistance system 200 can be used for automatic parking, for example for automatic lateral guidance and/or longitudinal guidance.

Step S7 of the method provides that the output signal 6 causes an interruption of the parking process and the output of an alert message 8 to a driver 21 of the vehicle 1. It may be provided that the parking process (which would cause the vehicle 1 to again intersect the blocking line 5 after having cleared it) can only be continued if there is a confirmation signal 9, which confirms a free traffic space 10 in the area of the corrective movements 4 and/or the parking movements 22. After step S6 or S7 of the method, the method 100 may be terminated or carried out again starting with step S1.

In FIGS. 2a to 2c, a traffic space 10 is schematically depicted, in which a parking process is to take place. In the traffic space 10 there is a roadway 13, which is laterally bounded by boundaries 12a, 12b. As already mentioned, the vehicle 1 in FIG. 2a is in the starting position A and wants to park in the perpendicular parking space 2. For this purpose, the vehicle 1 initially drove past the perpendicular parking space 2 in the forward direction and stopped approximately in the middle of the roadway 13 after passing the other vehicle 20b bounding the perpendicular parking space 2.

The vehicle 1 has a parking assistance system 200. The parking assistance system 200 now determines a trajectory 3 from the starting position A, along which the vehicle 1 must move in order to reach the parking position B. It is provided that the vehicle 1 is parked backwards into the perpendicular parking space 2. The parking process as well as the associated method 100 can be transitioned analogously to a forward parking process. In parallel with the determination of the trajectory 3, the blocking line 5 is determined, which runs in a straight line along the longitudinal axis 11 of the vehicle 1 in the starting position A.

The parking process begins with a first parking movement 22, in which the vehicle 1, as shown in FIG. 2a, first partially drives backwards into the perpendicular parking space 2. When determining the trajectory 3, it was previously determined that the parking position B is not accessible with this first parking movement 22, but that a corrective movement 4 is required.

FIG. 2b shows the vehicle 1 at the beginning of the corrective movement 4. During the first parking movements 22, the vehicle 1 was only moved backwards to such an extent that the blocking line 5 is not cleared by the vehicle 1. In other words, the contour 14 of the vehicle 1 always touches or intersects the blocking line 5. As a result, the roadway 13 is blocked until the last parking movement 22 is completed. The following traffic in the form of the other vehicle 20c can therefore only pass the area in front of the perpendicular parking space 2 when the parking process is almost complete. In other words, it is caused that the other vehicle 20c stops and only accelerates again when the roadway 13 is cleared again with the execution of the last parking movement 22.

The fact that the contour of the vehicle 1 always touches or intersects the blocking line 5 is either determined when checking whether the blocking line 5 will be cleared by the vehicle 1 before the last parking movement 22 is carried out, or it is ensured by determining a corrected trajectory 7 for which this is the case.

FIG. 2c shows the vehicle 1 in the parking position B. The traffic space 10 required for the parking process can now be cleared again, so that the other vehicle 20c can pass the perpendicular parking space.

Figure 3:
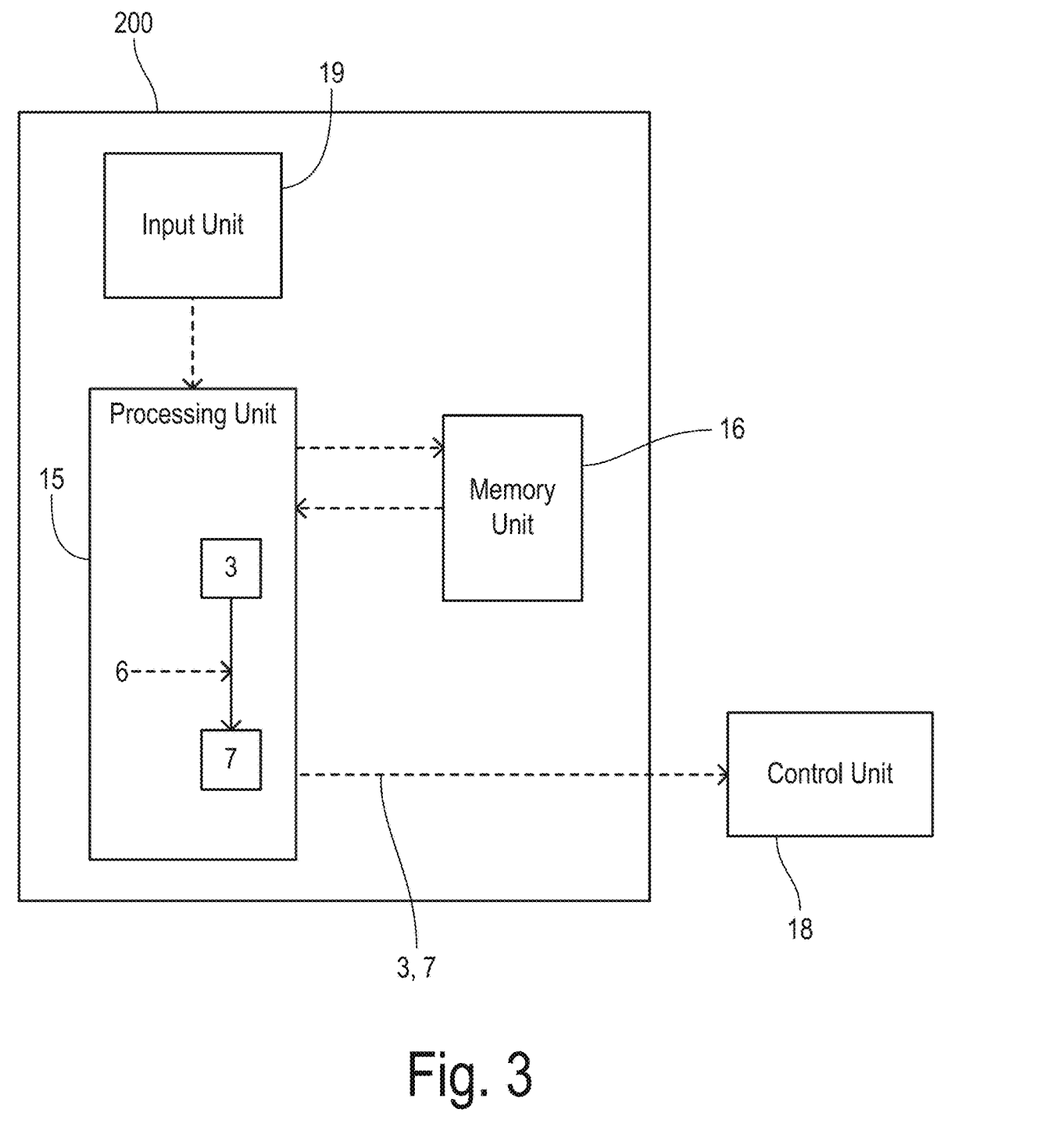
FIG. 3 shows a schematic representation of an exemplary parking assistance system.

FIG. 3 shows a first exemplary embodiment of a parking assistance system 200. The parking assistance system 200 can be used to carry out the exemplary method 100, which has been explained in more detail above with reference to FIGS. 1 and 2a to 2c.

The parking assistance system 200 has a processing unit 15, which has a signaling connection to a control unit 18 of the vehicle 1. The processing unit 15 can process input data based on instructions or a code programmed in the processing unit 15 according to one or more routines.

In particular, the processing unit 15 is designed to determine a trajectory 3 for a movement of the vehicle from its current position, for example the starting position A, to the parking position B and to check whether the trajectory 3 provides for one or more corrective movements 4. Furthermore, the processing unit 15 is designed for determining a blocking line 5 running in a straight line in the longitudinal direction through the vehicle 1 positioned in the starting position A. In addition, the processing unit 15 can check whether the blocking line 5 will be cleared by the vehicle 1 before the last parking movement 22 is carried out. If this is the case, the processing unit 15 generates a signal 6.

In the exemplary embodiment shown in FIG. 3, the signal 6 causes a corrected trajectory 7 to be determined in such a way that clearing the blocking line 5 by the vehicle 1 before executing the last parking movement 22 is prevented.

Both the original trajectory 3 and the corrected trajectory 7 are transmitted to the control unit 18 of the vehicle 1 and can be used by the control unit 18 at least for automatic lateral guidance of the vehicle 1, and if appropriate also for automatic longitudinal guidance of the vehicle 1.

In addition to the processing unit 15, the parking assistance system 200 has a memory unit 16, which is connected to the processing unit 15 by a signaling connection. This allows data to be stored in the memory unit 16 and retrieved from the memory unit 16 when required.

In addition, the parking assistance system 200 has an input unit 19, with which a user of the vehicle 1, for example the driver 21, can make inputs and, for example, specify specifications for the processing operation in the processing unit 15.

Figure 4:
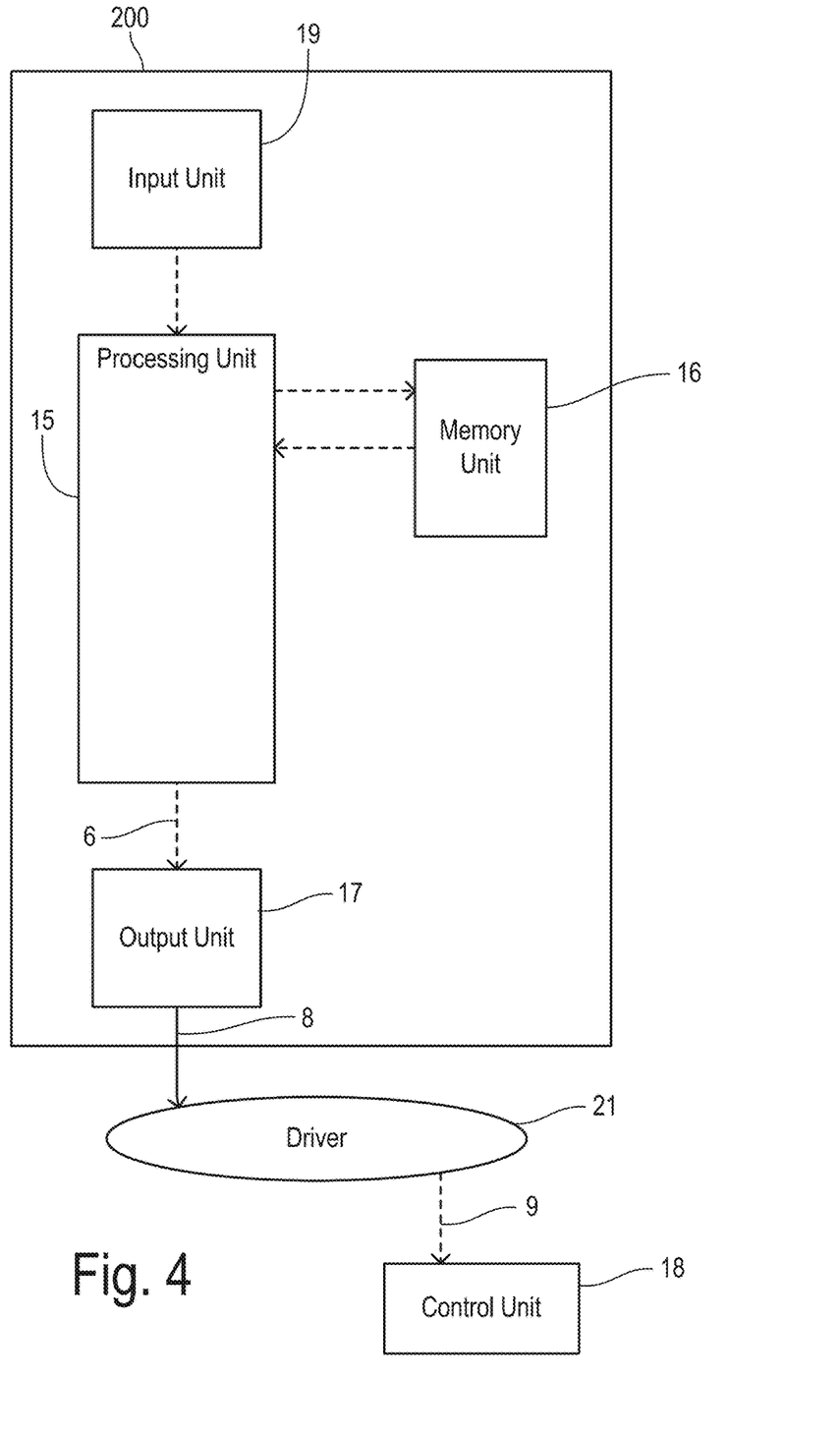
FIG. 4 shows schematic representation of another exemplary parking assistance system.

FIG. 4 shows another exemplary parking assistance system 200. Compared to the parking assistance system 200 of FIG. 3, no direct interaction of the parking assistance system 200 with a control unit 18 of the vehicle 1 is provided here. Rather, in this exemplary embodiment the output signal 6 causes an interruption of the parking process and the output of an alert message 8.

For this purpose, the parking assistance system 200 has an output unit 17, which can, for example, be in the form of a display for image output and optionally also sound output. The output unit 17 has a signaling connection to the processing unit 15. Based on the signal 6, the output unit 17 can generate an alert message 8 and output it to the driver 21 of the vehicle 1, for example in the form of a visual display on the display or an acoustic alert.

It is also provided that the parking process can only be continued if there is a confirmation signal 9, which confirms a free traffic space 10 in the area of the corrective movement 4 and/or the parking movement 22. In other words, the driver 21 is required to check the relevant area of the traffic space 10 to see whether it is possible to carry out the corrective movement 4.

The exemplary embodiments of a parking assistance system 200 shown in FIG. 3 and FIG. 4 can also be combined with each other. In other words, it may be provided that the processing unit 15 as described in FIG. 3 has a signaling connection to the control unit 18 of the vehicle 1 and can transmit trajectories 3, 7 to it, so that at least automatic lateral guidance of the vehicle 1 is possible. At the same time, an alert message 8 can be issued to the driver 21 if it is determined that the blocking line 5 will be cleared by the vehicle 1 before the last parking movement 22 is carried out. The parking process with at least automatic lateral guidance can then only be continued in the event of the confirmation signal 9.

REFERENCE CHARACTER LIST

1 Vehicle
2 Perpendicular parking space
3 Trajectory
4 Corrective movement
5 Blocking line
6 Signal
7 Corrected trajectory
8 Alert message
9 Confirmation signal
10 Traffic space
11 Longitudinal axis
12*a*, 12*b* Boundary
13 Roadway
14 Contour
15 Processing unit
16 Memory unit
17 Output unit
18 Control unit of the vehicle
19 Input unit
20*a*, 20*b*, 20*c* Other vehicle
21 Driver
22 Parking movement
200 Parking assistance system
A Starting position
B Parking position
S1 Determining a trajectory for a movement of the vehicle into the parking position with at least one parking movement
S2 Checking whether the trajectory provides for one or more corrective movements
S3 Determining a blocking line running longitudinally through the vehicle positioned in the starting position
S4 Checking whether the blocking line will be cleared before the vehicle executes the last parking movement
S5 Outputting a signal
S6 Determining a corrected trajectory in such a way that clearing the blocking line by the vehicle before the last parking movement is carried out is prevented
S7 Interrupting the parking process and issuing an alert message to the driver

What is claimed is:

1. A method of parking a vehicle from a starting position to a parked position in a parking space perpendicular to a roadway, comprising the steps of:
   determining a trajectory for a movement of the vehicle to the parked position with at least one parking movement;
   defining a longitudinal blocking line extending through the vehicle when positioned in the starting position, wherein the blocking line is defined such that when the vehicle intersects the blocking line then the vehicle blocks subsequent vehicles from passing the parking space;
   checking whether the trajectory provides for one or more corrective movements which include a change of direction between a forward direction and a reversing direction;
   if the trajectory provides for one or more corrective movements, then checking whether the blocking line will be cleared by the vehicle during a nonfinal parking movement and a nonfinal corrective movement before a last parking movement is carried out; and
   if the blocking line will be cleared by the vehicle during the nonfinal parking movement or the nonfinal corrective movement before the last parking movement is carried out then outputting a signal for interrupting the trajectory.

2. The method according to claim 1, wherein the blocking line is defined as a straight line which is parallel to a boundary of the roadway.

3. The method according to claim 1, wherein the blocking line is defined centrally between a pair of lane boundaries of the roadway.

4. The method according to claim 1, wherein the blocking line is cleared by the vehicle when a contour of the vehicle no longer intersects the blocking line.

5. The method according to claim 1, wherein the interrupting of the trajectory is comprised of a determination of a corrected trajectory in such a way that clearing the blocking line by the vehicle during the nonfinal parking movement or during the nonfinal corrective movement before executing the last parking movement is prevented.

6. The method according to claim 5, wherein the interrupting of the trajectory is comprised of outputting of an alert message to a driver, and wherein the corrected trajectory can only be followed if a confirmation signal is generated by the driver which confirms a free traffic space in the area of the corrected trajectory.

7. The method according to claim 1, wherein the blocking line is defined as parallel to a longitudinal axis of the vehicle.

8. The method according to claim 7, wherein the blocking line is defined as running along a central longitudinal axis of the vehicle.

9. The method according to claim 7, wherein the blocking line is defined as running at a predetermined distance from a central longitudinal axis of the vehicle.

10. A parking assistance system for parking a vehicle from a starting position to a parked position in a parking space perpendicular to a roadway, comprising:
  an environmental sensor system; and
  a processing unit coupled to the environmental sensor system to determine lateral guidance and longitudinal guidance for parking the vehicle, wherein the processing unit is configured to:
    determine a trajectory for a movement of the vehicle to the parked position with at least one parking movement;
    define a longitudinal blocking line extending through the vehicle when positioned in the starting position, wherein the blocking line is defined such that when the vehicle intersects the blocking line then the vehicle blocks subsequent vehicles from passing the parking space;
    check whether the trajectory provides for one or more corrective movements which include a change of direction between a forward direction and a reversing direction;
    if the trajectory provides for one or more corrective movements, then to check whether the blocking line will be cleared by the vehicle during a nonfinal parking movement and a nonfinal corrective movement before a last parking movement is carried out; and
    if the blocking line will be cleared by the vehicle during the nonfinal parking movement or the nonfinal corrective movement before the last parking movement is carried out then to output a signal for interrupting the trajectory.

11. The parking assistance system according to claim 10, wherein the blocking line is defined as a straight line which is parallel to a boundary of the roadway.

12. The parking assistance system according to claim 10, wherein the blocking line is defined centrally between a pair of lane boundaries of the roadway.

13. The parking assistance system according to claim 10, wherein the blocking line is cleared by the vehicle when a contour of the vehicle no longer intersects the blocking line.

14. The parking assistance system according to claim 10, wherein the interrupting of the trajectory is comprised of a determination of a corrected trajectory in such a way that clearing the blocking line by the vehicle during the nonfinal parking movement or during the nonfinal corrective movement before executing the last parking movement is prevented.

15. The parking assistance system according to claim 14, wherein the interrupting of the trajectory is comprised of outputting of an alert message to a driver, and wherein the corrected trajectory can only be followed if a confirmation signal is generated by the driver which confirms a free traffic space in the area of the corrected trajectory.

16. The parking assistance system according to claim 10, wherein the blocking line is defined as parallel to a longitudinal axis of the vehicle.

17. The parking assistance system according to claim 16, wherein the blocking line is defined as running along a central longitudinal axis of the vehicle.

18. The parking assistance system according to claim 16, wherein the blocking line is defined as running at a predetermined distance from a central longitudinal axis of the vehicle.

* * * * *